United States Patent
Cho et al.

(10) Patent No.: US 10,027,415 B2
(45) Date of Patent: Jul. 17, 2018

(54) APPARATUSES AND METHODS FOR TRANSMITTING AND RECEIVING CONTROL SIGNAL IN ANALOG RADIO-OVER-FIBER (ROF)-BASED MOBILE FRONTHAUL

(71) Applicant: ELECTRONICS AND TELECOMMUNICATIONS RESEARCH INSTITUTE, Daejeon-si (KR)

(72) Inventors: Seung Hyun Cho, Sejong-si (KR); Jong Hyun Lee, Daejeon-si (KR); Hwan Seok Chung, Daejeon-si (KR); Chan Gyo Han, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/079,714

(22) Filed: Mar. 24, 2016

(65) Prior Publication Data

US 2016/0285553 A1   Sep. 29, 2016

(30) Foreign Application Priority Data

Mar. 24, 2015 (KR) .................. 10-2015-0040994

(51) Int. Cl.
*H04B 10/25* (2013.01)
*H04B 10/2575* (2013.01)

(52) U.S. Cl.
CPC . *H04B 10/25753* (2013.01); *H04B 10/25759* (2013.01)

(58) Field of Classification Search
CPC .................. H04B 10/2575; H04B 10/25753
See application file for complete search history.

(56) References Cited

U.S. PATENT DOCUMENTS

| | | | |
|---|---|---|---|
| 7,113,708 B1* | 9/2006 | Creaney | H04L 25/4917 398/140 |
| 7,773,887 B2 | 8/2010 | Lee et al. | |
| 8,374,161 B2 | 2/2013 | Malladi | |
| 9,270,371 B2* | 2/2016 | Hou | H04B 10/0773 |
| 2014/0153919 A1 | 6/2014 | Casterline et al. | |
| 2014/0155075 A1* | 6/2014 | Cucala Garcia | H04W 16/16 455/450 |
| 2015/0229396 A1* | 8/2015 | Lee | H04B 10/25753 398/115 |
| 2015/0229397 A1* | 8/2015 | Shibata | H04B 10/25754 398/115 |

FOREIGN PATENT DOCUMENTS

| | | |
|---|---|---|
| KR | 10-0762637 B1 | 10/2007 |
| KR | 10-1142458 B1 | 4/2012 |
| KR | 2013-0016422 B1 | 2/2013 |

* cited by examiner

*Primary Examiner* — Dzung Tran
(74) *Attorney, Agent, or Firm* — Ladas & Parry LLP

(57) ABSTRACT

An apparatus for transmitting a control signal in a radio-over-fiber (RoF)-based mobile fronthaul includes: a data channel transmitter configured to generate a data signal at a preassigned frequency or wavelength; a control channel transmitter configured to generate a control signal at a designated frequency or wavelength that is shared with other apparatuses; and a combiner configured to combine the data signal with the control signal.

11 Claims, 19 Drawing Sheets

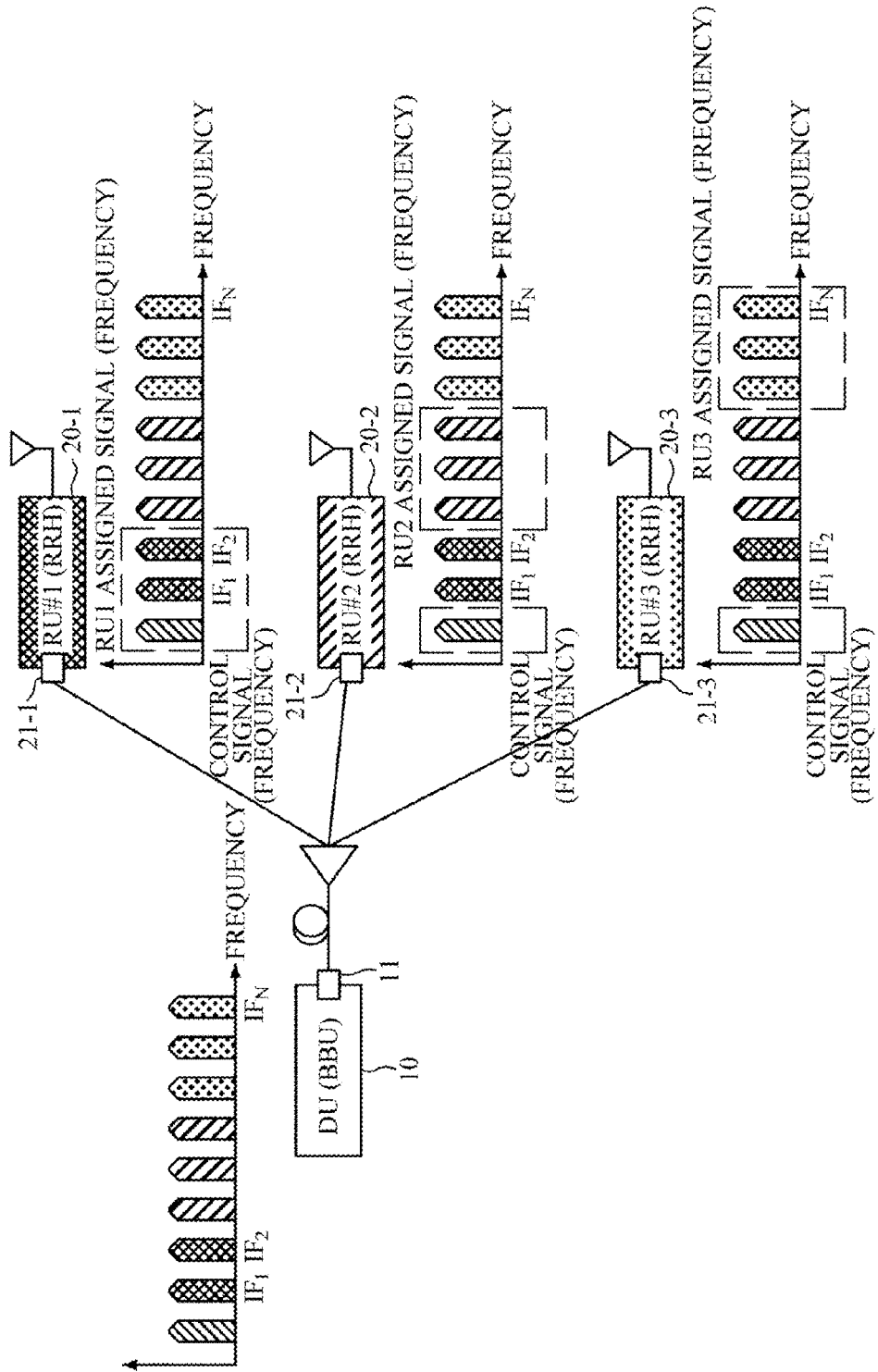

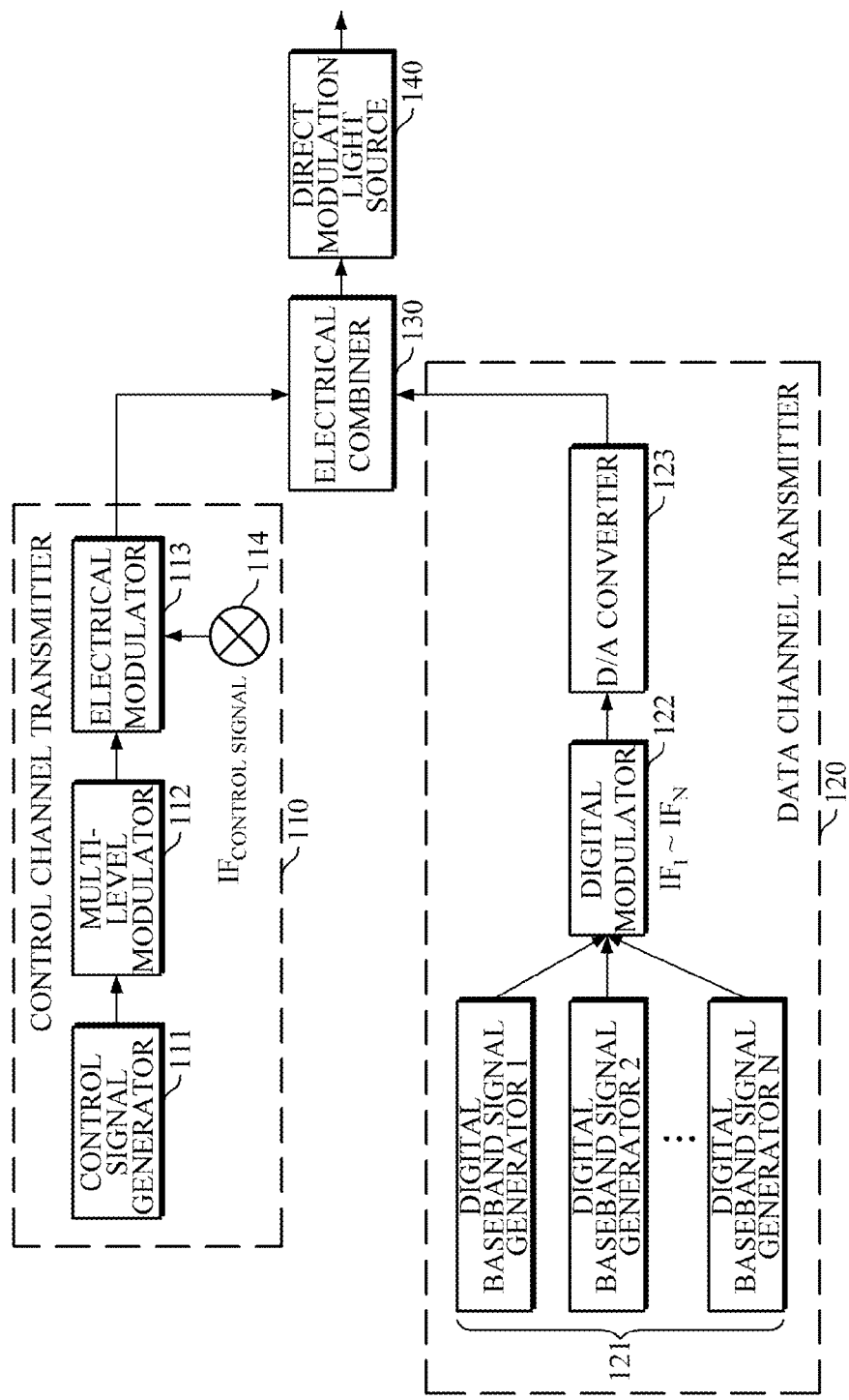

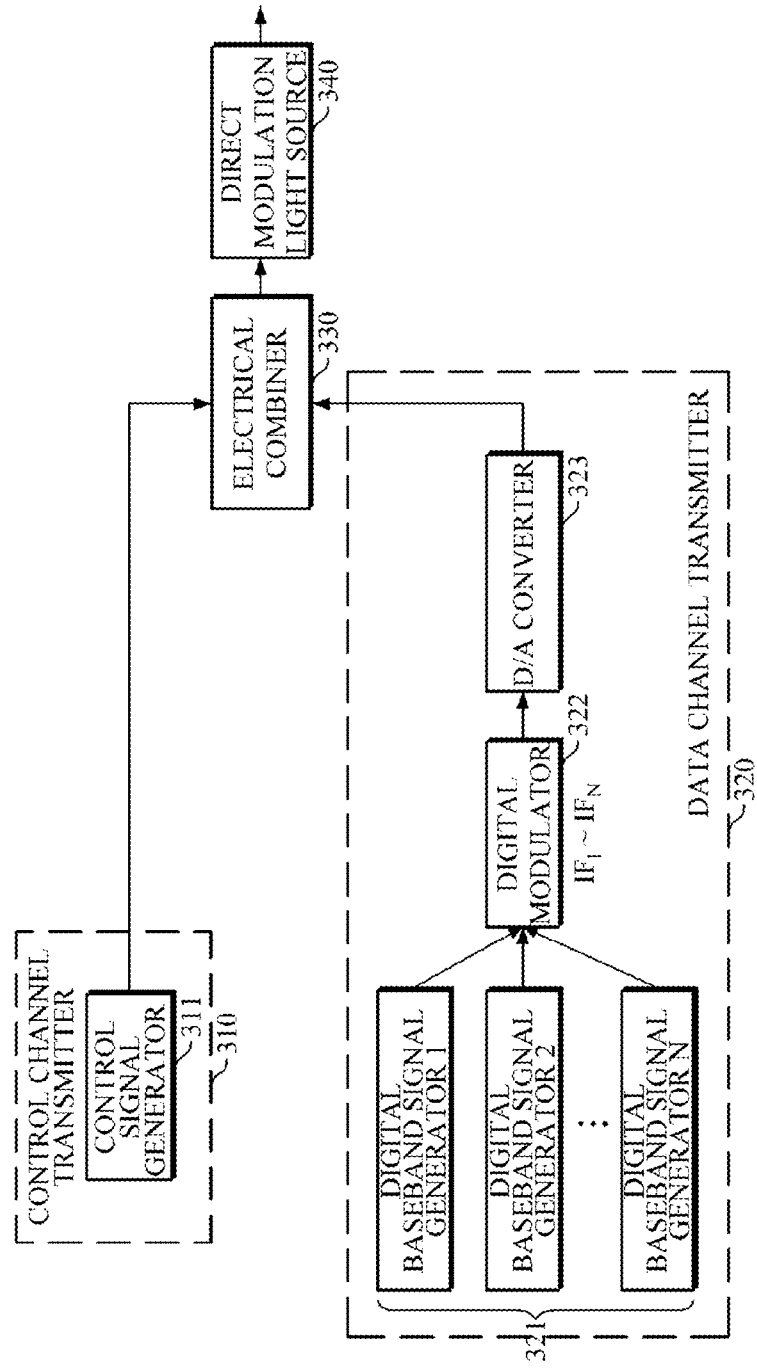

APPARATUSES AND METHODS FOR TRANSMITTING AND RECEIVING CONTROL SIGNAL IN ANALOG RADIO-OVER-FIBER (ROF)-BASED MOBILE FRONTHAUL

CROSS-REFERENCE TO RELATED APPLICATION(S)

This application claims priority from Korean Patent Application No. 10-2015-0040994, filed on Mar. 24, 2015, in the Korean Intellectual Property Office, the disclosure of which is incorporated herein by reference in its entirety.

BACKGROUND

1. Field

The following description relates to analog radio-over-frequency (RoF)-based mobile fronthaul, and more particularly, to apparatuses and methods for transmitting and receiving a control signal.

2. Description of Related Art

Radio-over-fiber (RoF)-based next generation mobile fronthaul technologies have drawn increasing attention worldwide for their analog signal transmission features which allow for simple configuration and economical construction and operation of networks.

Currently, mobile communication networks use cloud base station architecture that is divided into digital units (DUs) and radio units (RUs), implementing digital optical transmission based on common public radio interface (CPRI)/open base station architecture initiative (OBSAI). However, if the exiting digital-based optical transmission is applied in the $4^{th}$ generation (4G; LTE/LTE-Z) and 5G mobile communication networks, traffic needed for optical transmission and reception increases several tens of times due to digitalization processes, and hence the current optical transmission scheme may be practically difficult to apply.

The next-generation mobile fronthaul technologies based on analog RoF optical transmission load digital baseband signals for mobile communication on any intermediate frequency (IF) carriers, multiplexes the signals loaded on the IF carriers, and then transmits a multiplexed signal by using an inexpensive directly modulated light source and photodetector, thereby simplifying the design and reducing the cost of a DU/RU platform, as well as preventing degradation of service quality due to latency in digital signal processing. Also, said mobile fronthaul technologies support various types of network topologies, such as point-to-point, star, and ring topologies.

However, since no method for transferring control signals, such as antenna gains and output powers of RUs, which are used to control optical transmission or RUs, has been defined yet, a new method for implementing the control signal transfer in an economical and effective way is needed.

In the exiting mobile fronthaul that utilizes the current CPRI/OBSAI-based digital optical transmission scheme, control information is multiplexed in digital frames in time domain and then used; but in the analog RoF-based mobile fronthaul, if the exiting transmission scheme is used, it is not possible to transmit control information, and thus a new type of control information transmission scheme needs to be defined.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for transmitting a control signal in an analog radio-over-fiber (RoF)-based mobile fronthaul, the apparatus including: a data channel transmitter configured to generate a data signal at a preassigned frequency or wavelength; a control channel transmitter configured to generate a control signal at a designated frequency or wavelength that is shared with other apparatuses; and a combiner configured to combine the data signal with the control signal.

In another general aspect, there is provided an apparatus for receiving a control signal in an analog RoF-based mobile fronthaul, the apparatus including: a distributor configured to separate received signals into control signals and data signals; a control channel receiver configured to only demodulate a signal of a designated frequency or wavelength from among the control signals separated by the distributor; and a data channel receiver configured to demodulate the data signals separated by the distributor.

In yet another general aspect, there is provided an optical transmission method for an analog RoF-based mobile fronthaul, the optical transmission method including: generating a data signal at a preassigned frequency or wavelength; generating a control signal at a designated frequency or wavelength that is shared with other apparatuses; and combining the data signal with the control signal.

In still another general aspect, there is provided an optical receiving method for an analog RoF-based mobile fronthaul, the optical receiving method including: splitting received signals into control signals and data signals; demodulating a control signal of a designated frequency or wavelength which is shared with other apparatuses; and demodulating the split data signals.

Other features and aspects will be apparent from the following detailed description, the drawings, and the claims.

BRIEF DESCRIPTION OF THE DRAWINGS

FIG. 2 is a diagram illustrating a mobile fronthaul network structure over which a control channel is transmitted based on intermediate frequencies according to a first exemplary embodiment.

FIG. 3A is a diagram illustrating a configuration of a transmission apparatus for IF-based transmission of a control signal according to the first exemplary embodiment

FIG. 7A is a diagram illustrating a configuration of a transmission apparatus for NRZ-OOK-based transmission of a control signal according to a secondary embodiment.

Figure 1A:
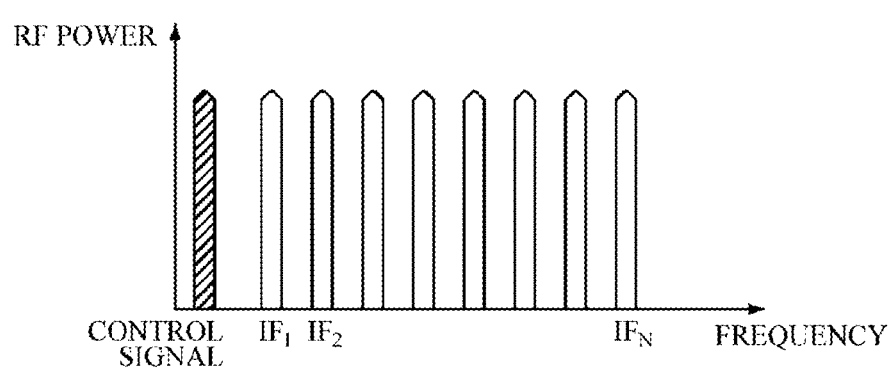
FIGS. 1A and 1B are graphs showing examples of a frequency plan used in intermediate frequency-based transmission of control channel according to a first exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following description relates to an apparatus and method for transmitting signals that allow a digital unit to control a radio unit in the next-generation analog radio-over-fiber (RoF)-based mobile fronthaul. Here, the control signals may include antenna gains, RF output powers, optical link management variables, and so on.

To this end, a transmission apparatus includes a data channel transmitter, a control channel transmitter, and a combiner, wherein the data channel transmitter generates a data signal at a preassigned frequency or wavelength, the control channel transmitter generates a control signal at a designated frequency or wavelength which is shared with other devices, and the combiner combines the data signal with the control signal.

A receiver apparatus includes a distributor, a control channel receiver, and a data channel receiver, wherein the distributor separates the received signal into a control signal and a data signal, the control channel receiver demodulates only a signal at a designated frequency or designated wavelength, from among control signals from the distributor that are shared with other devices, and the data channel receivers modulates the data signal from the distributor.

An optical transmission method includes operations of: generating a data signal at a preassigned frequency or wavelength; generating a control signal at a preassigned frequency or wavelength; and combining the data signal with the control signal.

An optical receiving method includes operations of: separating a received signal into a control signal and a data signal; modulating the control signal at a designated frequency or wavelength that is shared with other devices; and modulating the data signal.

The aforesaid apparatus and method for transmitting and receiving signals in the analog RoF-based mobile fronthaul may have three exemplary embodiments according to communication schemes.

A first exemplary embodiment relates to control channel transmission based on intermediate frequency, in which a control signal is transmitted using a designated intermediate frequency. A second exemplary embodiment relates to digital control channel transmission based on non-return-to-zero on-off keying (NRZ-OOK), in which a control signal is transmitted via digital baseband. A third exemplary embodiment relates to control channel transmission based on wavelength-division-multiplexing (WDM), in which a control signal is transmitted using a designated wavelength. Each exemplary embodiment will be described in detail below.

Figure 1B:
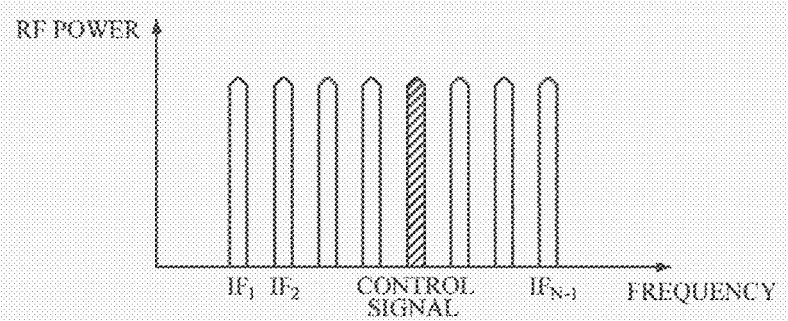

First Exemplary Embodiment: Scheme for Intermediate Frequency-Based Transmission of Control Channel FIGS. 1A and 1B are graphs showing examples of a frequency plan used in intermediate frequency-based transmission of control channel according to a first exemplary embodiment. Most intermediate frequencies ($IF_1$ to $IF_N$) are used to transmit data channels, and control channels are appropriately organized and operated by network service providers according to the network topology and operation schemes.

Referring to FIG. 1A, a control channel is assigned in the lowest frequency region, and referring to FIG. 1B, the control channel is assigned in an intermediate frequency region. Assigning the control channel in the lowest frequency region or the highest frequency region may simplify the configuration of an electrical filter to extract the control channel, thereby reducing the implementation cost of the transmission scheme.

FIG. 2 is a diagram illustrating a mobile fronthaul network structure over which a control channel is transmitted based on intermediate frequencies according to a first exemplary embodiment.

Referring to FIG. 2, the mobile fronthaul network consists of a digital unit (DU) 10, and radio units RU 20-1, 20-2, and 20-3. The DU 10 is located in a base station and the RUs 20-1, 20-2, and 20-3 are generally installed indoors and outdoors for general subscriber services. In FIG. 2, the DU 10 and the RUs 20-1, 20-2, and 20-3 in the mobile fronthaul network are connected in a star network topology, but the connections thereof may be made in various topologies, such as ring network, tree network, and point-to-point network topologies.

The DU 10 transmits and receives signals to and from the RUs 20-1, 20-2, and 20-3 using different intermediate frequencies assigned to the RUs 20-1, 20-2, and 20-3, for which the DU 10 and the RUs 20-1, 20-2, and 20-3 should each use an optical transceiver 11, 21-1, 21-2, and 21-3 with control channel demodulation/modulation capability and data channel demodulation/modulation capability.

Each of the RUs 20-1, 20-2, and 20-3 transmits and receives data to and from the DU 10 using an intermediate frequency allocated thereto. For example, RU1 20-1 transmits and receives data to and from the DU 10 using IF) and IF). RU2 20-2 and RU3 20-3 also have IFs allocated for data transmission. The number of IFs allocated to each RU 20-1, 20-2, and 20-3 for data transmission and the frequency allocation plan may be adjusted as needed by the network service providers.

Each of the RUs 20-1, 20-2, and 20-3 transmits and receives data via IFs allocated thereto while transmitting and receiving a control signal via the same IF shared among the RUs 20-1, 20-2, and 20-3. For example, in FIG. 2, each RU receives a control command from the DU, using a control channel assigned to a low-frequency band of the RU, and controls the RF-related parameters and parameters necessary for optical transmission/reception using the received control command.

A transmission apparatus and a receiving apparatus for transmission of a control signal and a data signal between the DU 10 and the RUs 20-1, 20-2, and 20-3 will be described with reference to FIGS. 3A and 3B, and an optical transmission method and an optical receiving method will be described with reference to FIGS. 4A and 4B.

FIG. 3A is a diagram illustrating a configuration of a transmission apparatus for IF-based transmission of a control signal according to the first exemplary embodiment.

Referring to FIG. 3A, a transmission apparatus includes a control channel transmitter 110, a data channel transmitter 120, an electrical combiner 130, and a directly modulated light source 140.

The control channel transmitter 110 includes a control signal generator 111, a multi-level modulator 112, and an electrical modulator 113.

The control signal generator 111 generates a control signal in a serial binary format. The multi-level modulator 112 modulates the generated control signal at multiple levels, and converts the modulated control signal into an analog signal. The electrical modulator 113 loads said modulated control signal from the multi-level modulator 112 on a designated IF carrier. Here, the electrical modulator 113 uses an IF carrier that is predetermined according to the frequency plan for the control signal of FIG. 1A or 1B. Also, the electrical modulator 113 may use an oscillator 114 whose voltage can be controlled, so as to select an optimal IF carrier frequency from a frequency band appropriate to an operational state of the link.

The data channel transmitter 120 includes a digital baseband signal generator 121, a digital modulator 122, and a digital-to-analog (D/A) converter 123.

The digital baseband signal generator 121 generates an in-phase and quadrature-phase (IQ) signal to be transmitted to the RU or the DU. In the exemplary embodiment, a plurality of digital baseband signal generators 121 may be provided, and multiple parallel signals generated by the respective digital baseband signal generators 121 are input to the digital modulator 122.

The digital modulator 122 combines generated single- or multi-channel baseband signals, and generates a digital IQ signal loaded on a single- or multi-IF carrier that is up-converted to a preassigned IF frequency. The D/A converter 123 with an appropriate sampling rate and bit resolution converts the digital IQ-modulated signal into an analog signal.

Although not illustrated, the control channel transmitter 110 and the data channel transmitter 120 each may include an amplifier and an attenuator that each have an appropriate gain.

The electrical combiner 130 receives the control signal output from the control channel transmitter 110 and the data signal output from the data channel transmitter 120 and combines the two signals in frequency domain. The directly modulated light source 140 optically modulates the combined signal output from the electrical combiner 130 and outputs a resultant signal.

Figure 3B:
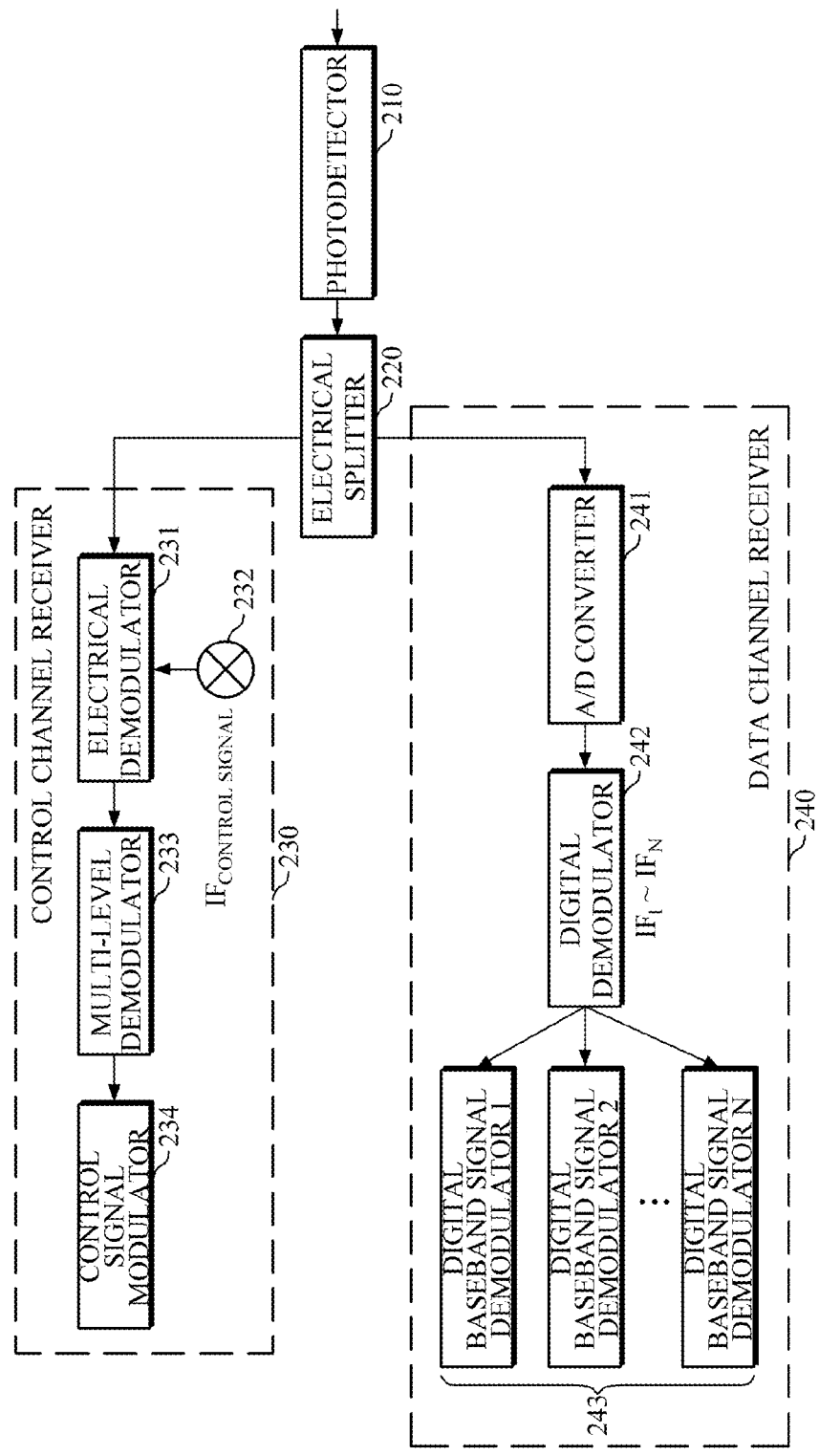
FIG. 3B is a diagram illustrating a configuration of a receiving apparatus for intermediate frequency (IF)-based transmission of a control signal according to the first exemplary embodiment.

FIG. 3B is a diagram illustrating a configuration of a receiving apparatus for IF-based transmission of a control signal according to the first exemplary embodiment.

Referring to FIG. 3B, a receiving apparatus for IF-based transmission of a control signal includes a photodetector 210, an electrical splitter 220, a control channel receiver 230, and a data channel receiver 240.

The photodetector 210 electrically converts a received optical signal, and the electrical splitter 220 splits the signal sent from the photodetector 210 into a control signal and a data signal in frequency domain.

The control channel receiver 230 includes an electrical demodulator 231, a multi-level demodulator 233 and a control signal modulator 234. The electrical demodulator 231 receives signals distributed by the electrical splitter 220, filters said signals to only pass a control channel signal within a predesignated frequency band, and then frequency-down-converts the control channel signal to a baseband signal. Also, the electrical demodulator 231 may use an oscillator 232 whose voltage can be controlled, so as to select an optimal carrier frequency for demodulation of a control channel from a frequency band that is appropriate to an operational state of the link. The multi-level demodulator 233 receives the signal from the electrical demodulator 231, performs analog-to-digital conversion and multi-level demodulation on the received signal, and then converts a resultant signal to a control signal with a serial binary format. The control signal demodulator 234 receives the control signal from the multi-level demodulator 233 and demodulates serial binary data of said control signal to thereby allow said signal to be used in operation of DU or RU.

The data channel receiver 240 includes an analog-to-digital (A/D) converter 241, a digital demodulator 242, and a digital baseband signal demodulator 243.

The A/D converter 241 converts an analog data signal separated by the electrical splitter 220 into a digital signal, by using an appropriate sampling rate and bit resolution. In this case, to suppress deterioration of signal quality due to interference of a control channel, high bandpass filters may be provided in front of the A/D converter 241. The digital demodulator 242 converts a received digital IQ signal, which is loaded on a single- or multi-IF carrier, into a single- or multi-channel baseband IQ signal by frequency-down-converting the received digital IQ signal. The digital baseband signal demodulator 243 demodulates the signal, which is destined for the RU or DU, to a digital baseband data signal with a binary waveform.

Although not illustrated, for amplification and attenuation, the control channel receiver 210 and the data channel receiver 220 may each include an amplifier and an attenuator that each have an appropriate gain.

Figure 4A:
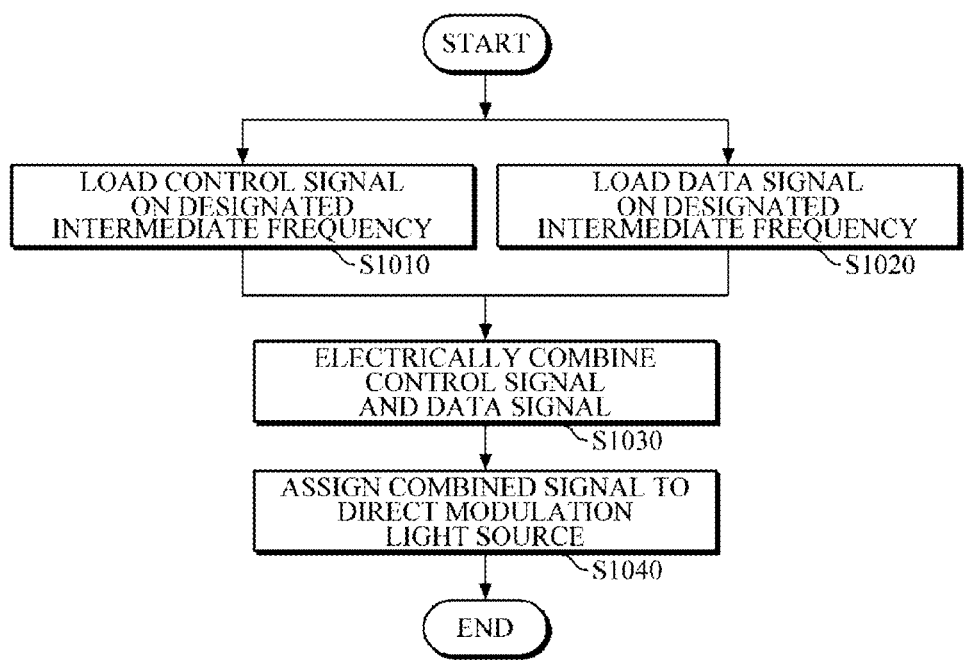
FIG. 4A is a flowchart illustrating an optical transmission method for IF-based transmission of a control signal according to the first exemplary embodiment.

FIG. 4A is a flowchart illustrating an optical transmission method for IF-based transmission of a control signal according to the first exemplary embodiment.

Referring to FIG. 4A, a transmission apparatus loads a control signal on a designated intermediate frequency, as depicted in S1010. In detail, the control signal is generated in a serial binary format, multi-level modulation and digital-to-analog conversion are performed on the generated control signal, and then a resultant control signal is loaded on a designated IF carrier. In this case, for control signal transmission, a specific IF carrier that is predesignated according to a frequency plan as shown in FIG. 1A or 1B may be used. The transmission apparatus loads a data signal on an assigned IF, as depicted in S1020. In detail, single- or multi-channel baseband IQ signals to be transmitted to an RU or a DU are combined together to thereby generate a digital IQ signal loaded on a single- or multi-IF carrier that is up-converted to a preassigned IF, and then a digital IQ-modulated signal is converted into an analog signal with an appropriate sampling rate and bit resolution for optical transmission. Here, S1010 and S1020 may be concurrently performed as shown in FIG. 4A, which is, however, only provided as an exemplary embodiment, and said operations may be sequentially performed.

The transmission apparatus electrically combines the control signal and the data signal in frequency domain, as depicted in S1030, and optically modulates the combined signal and outputs a resultant signal, as depicted in S1040.

Figure 4B:
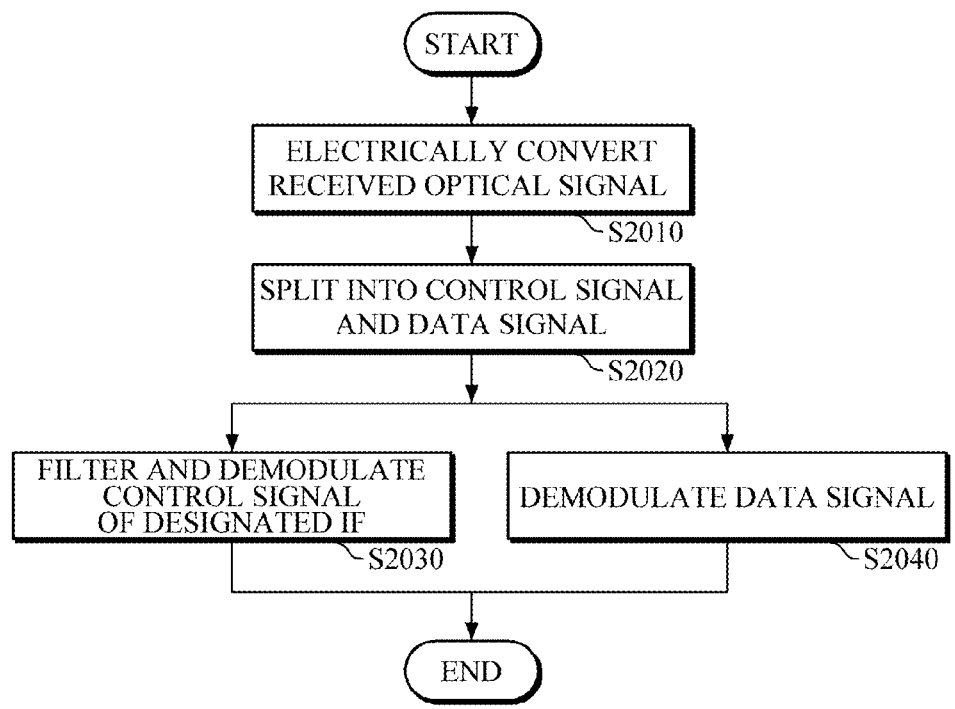
FIG. 4B is a flowchart illustrating an optical receiving method for IF-based transmission of a control signal according to the first exemplary embodiment.

FIG. 4B is a flowchart illustrating an optical receiving method for IF-based transmission of a control signal according to the first exemplary embodiment.

Referring to FIG. 4B, a receiving apparatus electrically converts a received signal, as depicted in S2010, and then splits the converted signal into a control signal and a data signal, as depicted in S2020.

The receiving apparatus filters the spilt signals and demodulates a control signal within a predesignated frequency band, as depicted in S2030. In detail, the split control signal is frequency-down-converted to a baseband signal, the baseband signal goes through analog-to-digital conversion, and a signal resulting from multi-level modulating the digital signal is modulated to a control signal with a serial binary format, thereby allowing the received signal to be used in operation of DU or RU. The receiving apparatus demodulates a data signal from the split signals, as depicted in S2040. In detail, the split analog data signal is converted into a digital signal by using an appropriate sampling rate and bit resolution, a digital IQ signal loaded on the single- or multi-IF carrier is down-converted in frequency and is converted into a single- or multi-channel baseband IQ signal, and a signal that is destined for the RU or the DU is demodulated into a digital baseband signal. Here, S2030 and S2040 may be concurrently performed, as shown in FIG. 4B, which is, however, only provided as an exemplary embodiment, and said operations may be sequentially performed.

Second Exemplary Embodiment: Scheme for NRZ-OOK-Based Transmission of Digital Control Channel FIG. 5 is a diagram illustrating an example of a frequency plan used in NRZ-OOK-based transmission of control channel according to a second exemplary embodiment.

Figure 5:
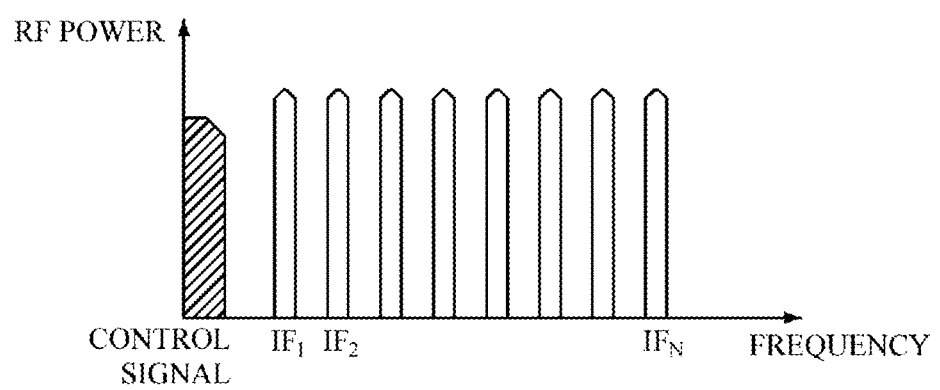
FIG. 5 is a diagram illustrating an example of a frequency plan used in non-return-to-zero on-off keying (NRZ-OOK)-based transmission of control channel according to a second exemplary embodiment.

Because a bandwidth required for transmitting and receiving control information over a control channel is low, generally less than about 10 Mb/s, it is most economical to use a digital baseband signal without conversion in transmission of a control channel, as shown in FIG. 5. If the NRZ-OOK coding format, which is most frequently used in digital signal transmission, is employed, it is possible to simplify the configurations of transmission and receiving apparatuses, which is advantageous from an implementation point of view. However, control channel information loaded on a low frequency band may cause frequency intermodulation interference in a high frequency band, and hence electrical power of the control channel needs to be carefully determined.

Figure 6:
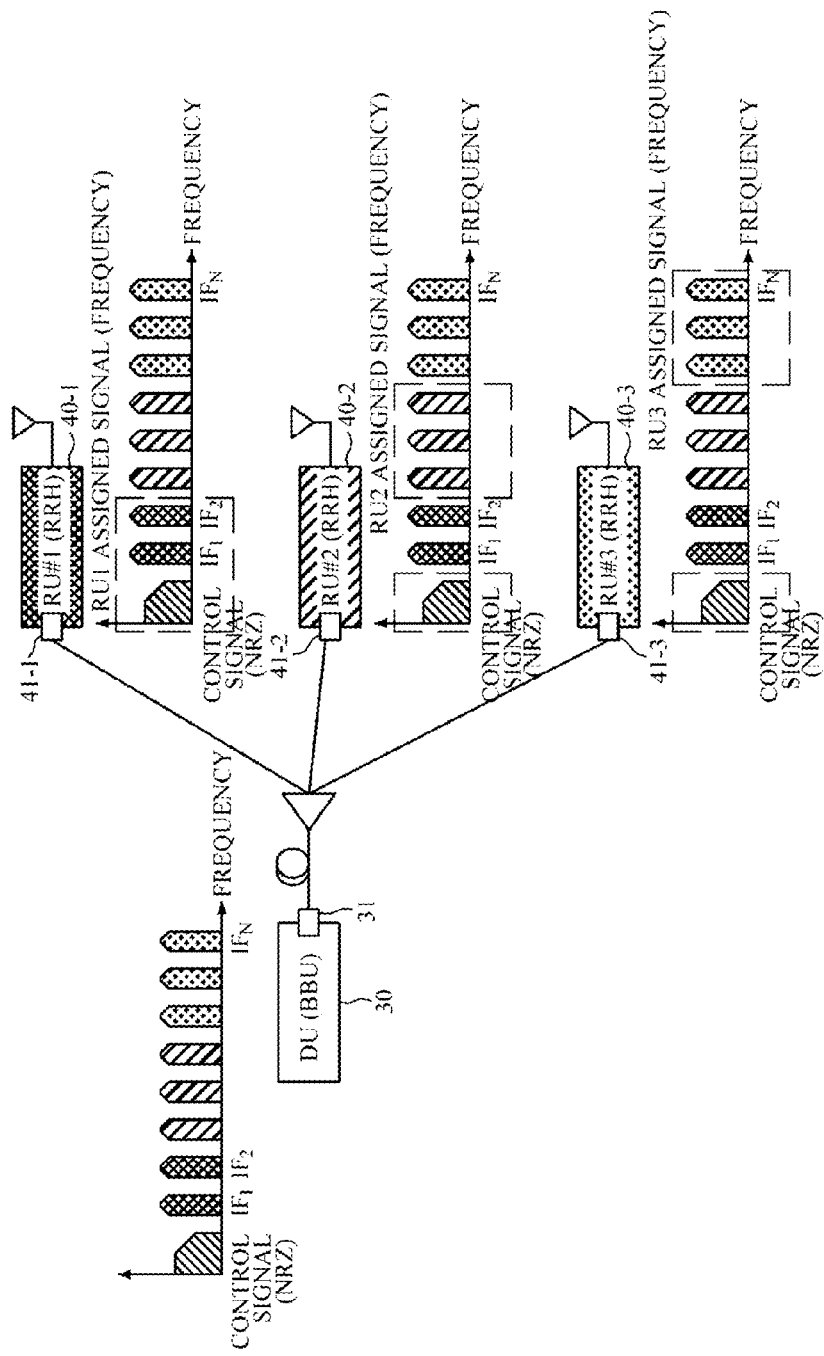
FIG. 6 is a diagram illustrating a mobile fronthaul network structure over which a control channel is transmitted based on NRZ-OOK according to a second exemplary embodiment.

FIG. 6 is a diagram illustrating a mobile fronthaul network structure over which a control channel is transmitted based on NRZ-OOK according to a second exemplary embodiment.

Referring to FIG. 6, a mobile fronthaul network consists of a digital unit (DU) 30 and radio units (RUs) 40-1, 40-2, and 40-3. The DU 30 is located in a base station which includes a baseband unit (BBU), and the RUs are generally installed indoors and outdoors for general subscriber services. Here, the DU 30 and the RUs 40-1, 40-2, and 40-3 are connected in a star network topology, but the connections thereof may be made in various topologies, such as ring network, tree network, and point-to-point network topologies.

The DU 30 transmits and receives signals to and from the RUs 40-1, 40-2, and 40-3 using different intermediate frequencies assigned to the RUs 40-1, 40-2, and 40-3, for which the DU 30 and the RUs 40-1, 40-2, and 40-3 should each use an optical transceiver 31, 41-1, 41-2, and 41-3 with control channel demodulation/modulation capability, as well as data channel demodulation/modulation capability.

Each of the RUs 40-1, 40-2, and 40-3 transmits and receives data to and from the DU 30 using an intermediate frequency allocated thereto. For example, as shown in FIG. 6, RU1 40-1 transmits and received data to and from the DU 10 using $IF_1$ and $IF_2$. RU2 40-2 and RU3 40-3 also have IFs allocated for data transmission. The number of IFs allocated to each RU 40-1, 40-2, and 40-3 for data transmission and the frequency allocation plan may be adjusted as needed by the network service providers.

Each of the RUs 40-1, 40-2, and 40-3 transmits and receives data via IFs allocated thereto while they all transmit and receive a control signal through a digital baseband.

A transmission apparatus and a receiving apparatus for transmission of a control signal and a data signal between the DU 30 and the RUs 40-1, 40-2, and 40-3 will be described with reference to FIGS. 7A and 7B, and an optical transmission method and an optical receiving method will be described with reference to FIGS. 8A and 8B.

FIG. 7A is a diagram illustrating a configuration of a transmission apparatus for NRZ-OOK-based transmission of a control signal according to a secondary embodiment.

Referring to FIG. 7A, a transmission apparatus for NRZ-OOK-based transmission of a control signal includes a control channel transmitter 310, a data channel transmitter 320, an electrical combiner 330, and a directly modulated light source 340.

The control channel transmitter 310 includes a control signal generator 311 to generate a control signal as a digital baseband signal with a serial binary format.

The data channel transmitter 320 includes a digital baseband signal generator 321, a digital modulator 322, and a digital-to-analog (D/A) converter 323.

The digital baseband signal generator 321 generates an IQ signal to be transmitted to the RUs or the DU. In one exemplary embodiment, a plurality of digital baseband signal generators 321 may be provided, and multiple parallel signals generated by the respective digital baseband signal generators 321 are input to the digital modulator 322. The digital modulator 322 combines generated single- or multi-channel baseband IQ signals to thereby generate a digital IQ signal loaded on a single- or multi-IF carrier that is up-converted to a preassigned IF frequency. The D/A converter 323 converts the digital IQ-modulated signal into an analog signal by using an appropriate sampling rate and bit resolution for optical transmission.

Although not illustrated, the control channel transmitter 310 and the data channel transmitter 320 each may include an amplifier and an attenuator that each have an appropriate gain.

The electrical combiner 330 receives the control signal output from the control channel transmitter 310 and the data signal output from the data channel transmitter 320 and combines the two signals in frequency domain.

The directly modulated light source 340 optically modulates the combined signal output from the electrical combiner 330 and outputs a resultant signal.

Figure 7B:
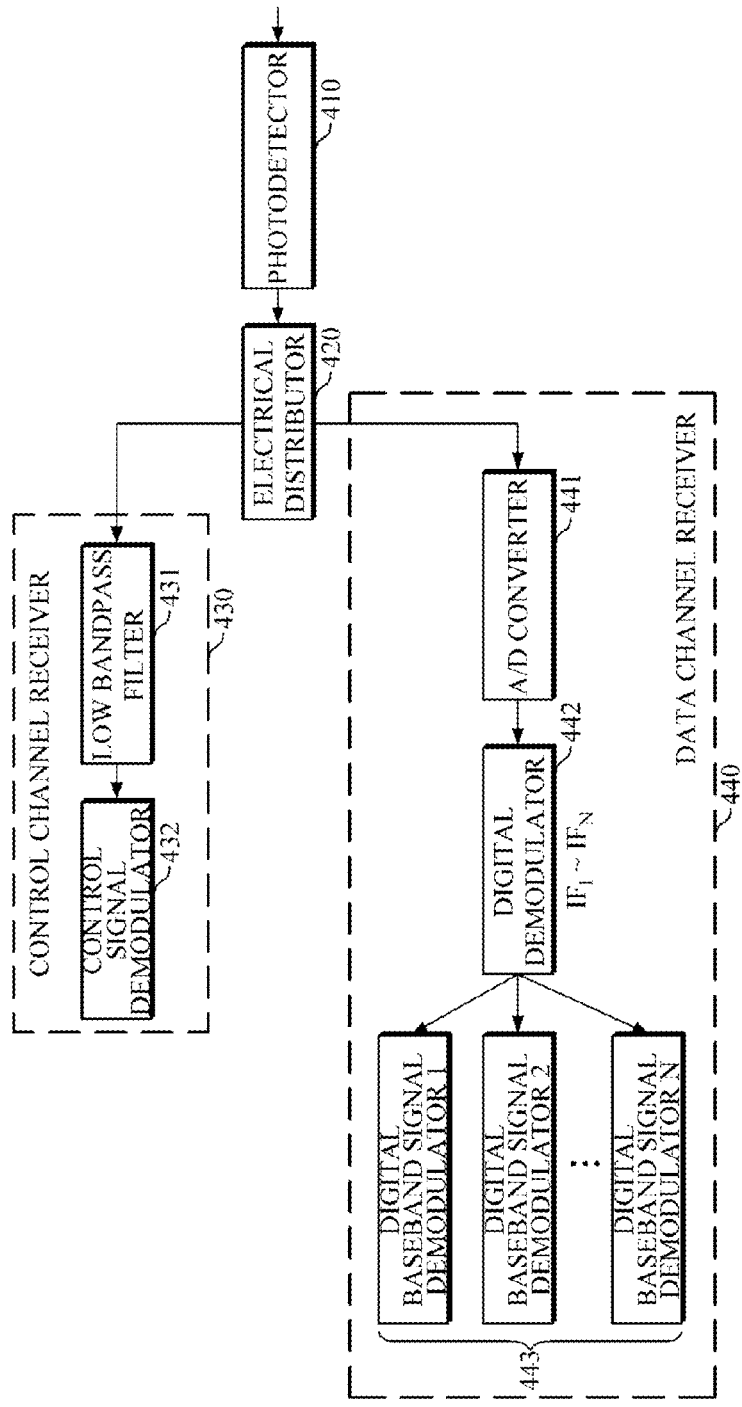
FIG. 7B is a diagram illustrating a configuration of a receiving apparatus for NRZ-OOK-based transmission of a control signal according to the second exemplary embodiment.

FIG. 7B is a diagram illustrating a configuration of a receiving apparatus for NRZ-OOK-based transmission of a control signal according to the second exemplary embodiment.

Referring to FIG. 7B, a receiving apparatus for NRZ-OOK-based transmission of a control signal includes a photodetector 410, an electrical splitter 420, a control channel receiver 430, and a data channel receiver 440.

The photodetector 410 electrically converts a received optical signal into an electrical signal, and the electrical splitter 420 splits the signal output from the photodetector 410 into a control signal and a data signal in frequency domain.

The control channel receiver 430 includes a low bandpass filter 431 and a control signal demodulator 432. The low bandpass filter 431 filters received signals to pass a control channel signal within a designated baseband. The control signal demodulator 431 demodulates serial binary data to thereby allow the received control signal to be used in operation of DU or RU.

The data channel receiver 440 includes an analog-to-digital (A/D) converter 441, a digital demodulator 442, and a digital baseband signal demodulator 443.

The A/D converter 441 converts an analog data signal separated by the electrical splitter 420 into a digital signal by using an appropriate sampling rate and bit resolution. In this case, to suppress deterioration of signal quality due to interference of a control channel, high bandpass filters may be provided in front of the A/D converter 441. The digital demodulator 442 converts a received digital IQ signal, which is loaded on a single- or multi-IF carrier, into a single- or multi-channel baseband IQ signal by frequency-down-converting the received digital IQ signal. The digital baseband signal demodulator 443 demodulates the signal, which is destined for the RU or DU, to a digital baseband data signal with a binary waveform.

Although not illustrated, for amplification and attenuation, the control channel receiver 410 and the data channel receiver 420 may each include an amplifier and an attenuator that each have an appropriate gain.

Figure 8A:
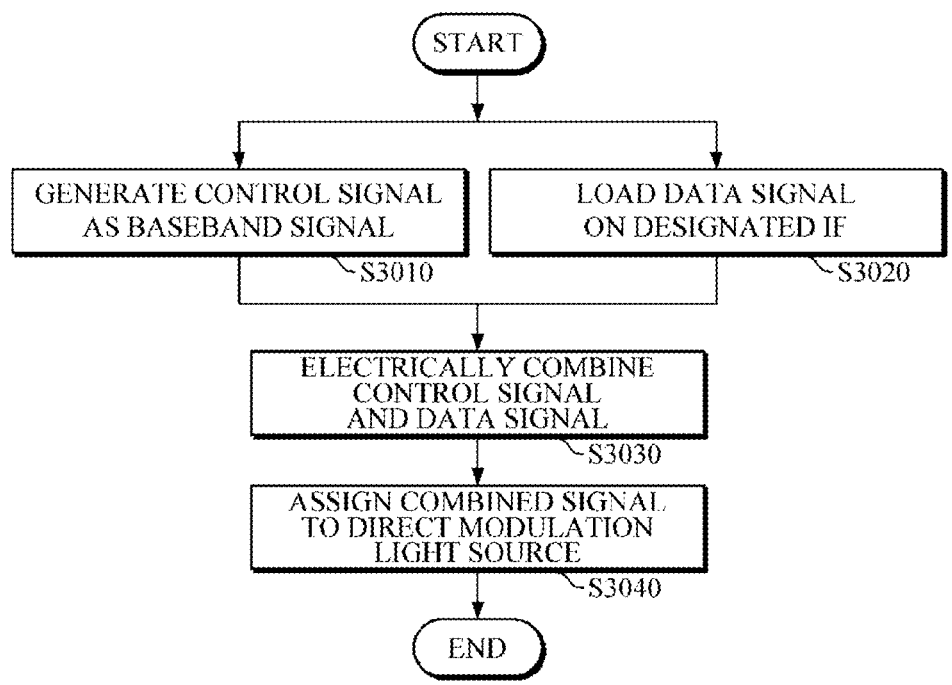
FIG. 8A is a flowchart illustrating an optical transmission method for NRZ-OOK-based transmission of a control signal according to the second exemplary embodiment.

FIG. 8A is a flowchart illustrating an optical transmission method for NRZ-OOK-based transmission of a control signal according to the second exemplary embodiment.

Referring to FIG. 8A, a transmission apparatus generates a control signal which is a designated baseband signal, as depicted in S3010. The transmission apparatus loads a data signal on an assigned IF, as depicted in S3020. In detail, single- or multi-channel baseband IQ signals destined for an RU or a DU are combined together to thereby generate a digital IQ signal loaded on a single- or multi-IF carrier that is up-converted to a preassigned IF, and then a digital IQ-modulated signal is converted into an analog signal with an appropriate sampling rate and bit resolution for optical transmission. Here, S3010 and S3020 may be concurrently performed as shown in FIG. 8A, which is, however, only provided as an exemplary embodiment, and said operations may be sequentially performed.

The transmission apparatus electrically combines the control signal and the data signal in frequency domain, as depicted in S3030, optically modulates the combined signal and outputs a resultant signal, as depicted in S3040.

Figure 8B:
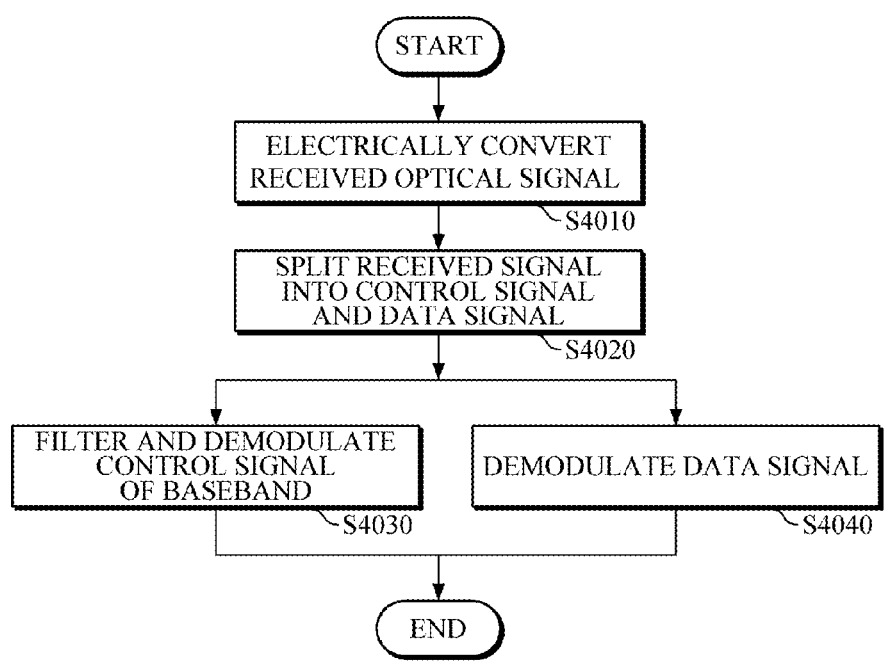
FIG. 8B is a flowchart illustrating an optical receiving method for NRZ-OOK-based transmission of a control signal.

FIG. 8B is a flowchart illustrating an optical receiving method for NRZ-OOK-based transmission of a control signal.

Referring to FIG. 8B, a receiving apparatus electrically converts a received signal, as depicted in S4010, and then splits the converted signal into a control signal and a data signal, as depicted in S4020.

The receiving apparatus filters the split signals to select a control signal within a baseband and demodulates the control signal, as depicted in S4030. That is, serial binary data is demodulated into the control signal in a baseband, such that the received control signal can be used in operation of DU or RU. The receiving apparatus demodulates a data signal from the split signals, as depicted in S4040. In detail, the split analog data signal is converted into a digital signal at an appropriate sampling rate and bit resolution, a digital IQ signal loaded on the single- or multi-IF carrier is down-converted in frequency and is converted into a single- or multi-channel baseband IQ signal, and a signal that is destined for the RU or the DU is demodulated into a digital baseband signal. Here, S4030 and S4040 may be concurrently performed, as shown in FIG. 4B, which is, however, only provided as an exemplary embodiment, and said operations may be sequentially performed.

Figure 9:
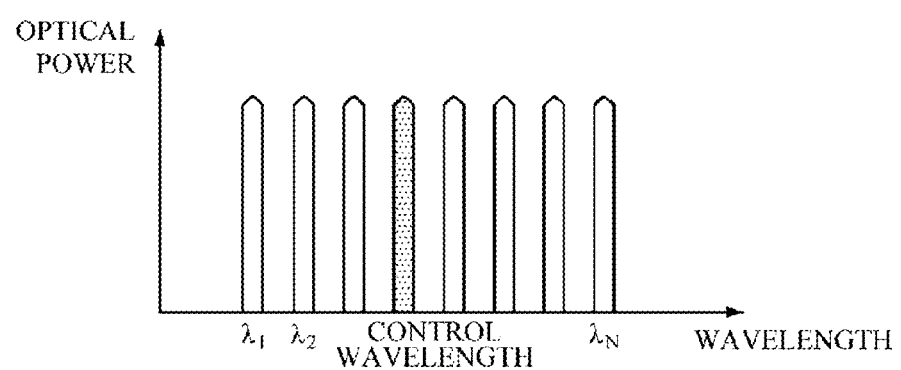
FIG. 9 is a diagram illustrating an example of a wavelength plan used in WDM-based transmission of a control channel according to a third exemplary embodiment.

Third Exemplary Embodiment: Scheme for WDM-Based Transmission of a Control Channel FIG. 9 is a diagram illustrating an example of a wavelength plan used in WDM-based transmission of a control channel according to a third exemplary embodiment. Because generally a bandwidth required for transmitting and receiving control information over a control channel is low, less than about 10 Mb/s, it is most economical to use a digital baseband signal without conversion in transmission of a control channel. However, wide bandwidth may also be used when needed. If the NRZ-OOK coding format, which is most frequently used in digital signal transmission, is employed, it is possible to simplify the configurations of transmission and receiving apparatuses, which is advantageous from an implementation point of view.

Figure 10:
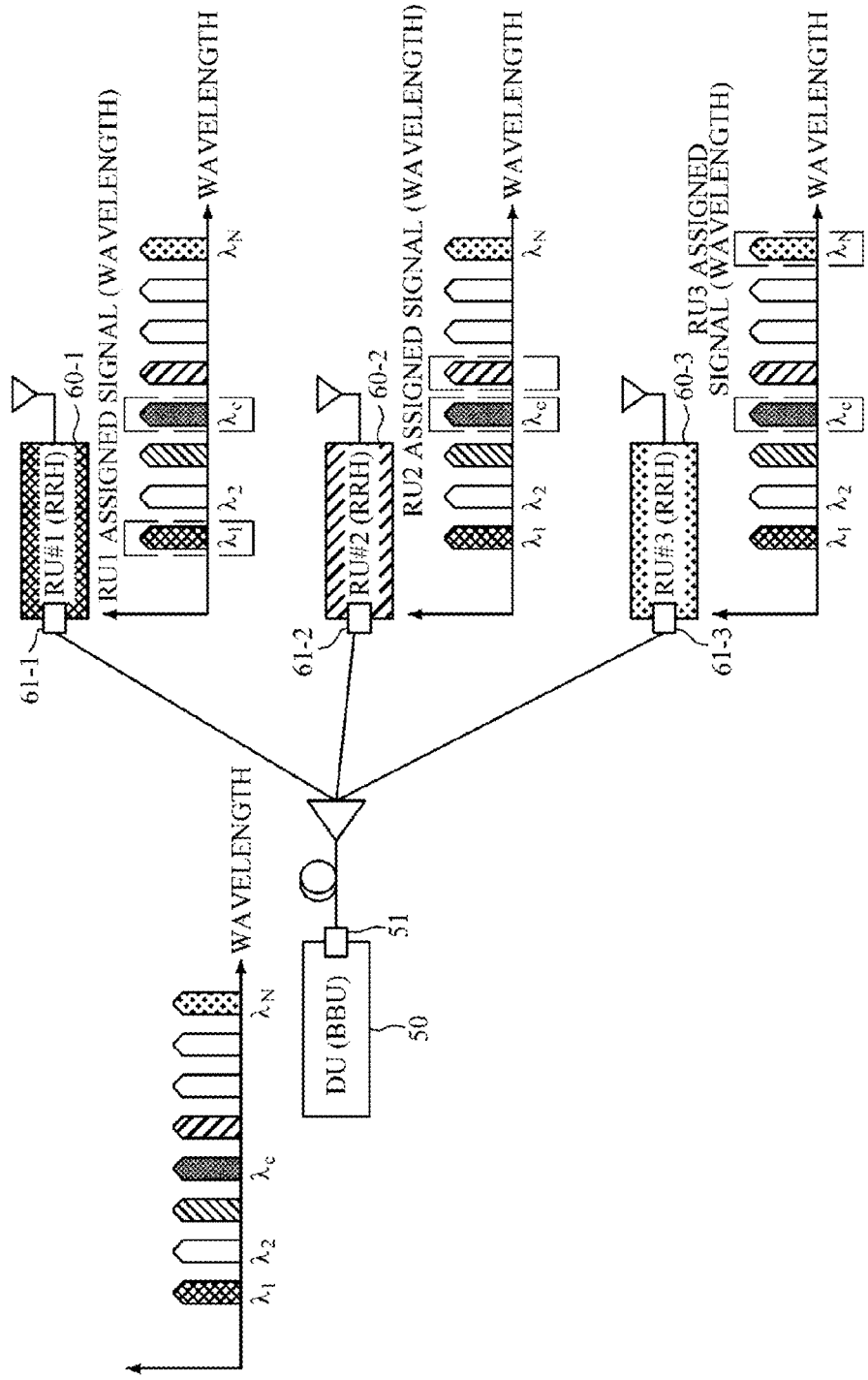
FIG. 10 is a diagram illustrating a mobile fronthaul network structure over which a control channel is transmitted based on a wavelength division multiplexing (WDM) technology according to a third exemplary embodiment.

FIG. 10 is a diagram illustrating a mobile fronthaul network structure over which a control channel is transmitted based on a WDM technology according to a third exemplary embodiment.

Referring to FIG. 10, a mobile fronthaul network consists of a digital unit (DU) 50 and radio units (RUs) 60-1, 60-2, and 60-3. The DU 50 is located in a base station which includes a baseband unit (BBU), and the RUs are generally installed indoors and outdoors for general subscriber services. Here, the DU 50 and the RUs 60-1, 60-2, and 60-3 are connected in a star network topology, but the connections thereof may be made in various topologies, such as ring network, tree network, and point-to-point network topologies.

The DU 50 transmits and receives signals to and from the RUs 60-1, 60-2, and 60-3 using different wavelengths assigned to the RUs 40-1, 40-2, and 40-3, for which the DU 50 and the RUs 60-1, 60-2, and 60-3 should each use an optical transceiver 51, 61-1, 61-2, and 61-3 with control channel demodulation/modulation capability, as well as data channel demodulation/modulation capability.

Each of the RUs 60-1, 60-2, and 60-3 transmits and receives data to and from the DU 50 using the wavelengths preassigned thereto. For example, RU1 60-1 transmits and receives data to and from the DU 50 using wavelengths $\lambda_1$ and $\lambda_2$. RU2 60-2 and RU3 60-3 also have wavelengths allocated for data transmission. The number of wavelengths allocated to each of the RUs 60-1, 60-2, and 60-3 for data transmission and the wavelength allocation plan may be adjusted as needed by the network service providers.

The RUs 60-1, 60-2, and 60-3 transmit and receive data via wavelengths allocated thereto, whereas they use the same designated wavelength $\lambda_C$ to transmit and receive a control signal.

A transmission apparatus and a receiving apparatus for transmission of a control signal and a data signal between the DU 50 and the RUs 60-1, 60-2, and 60-3 will be described with reference to FIGS. 11A and 11B, and an optical transmission method and an optical receiving method will be described with reference to FIGS. 12A and 12B.

Figure 11A:
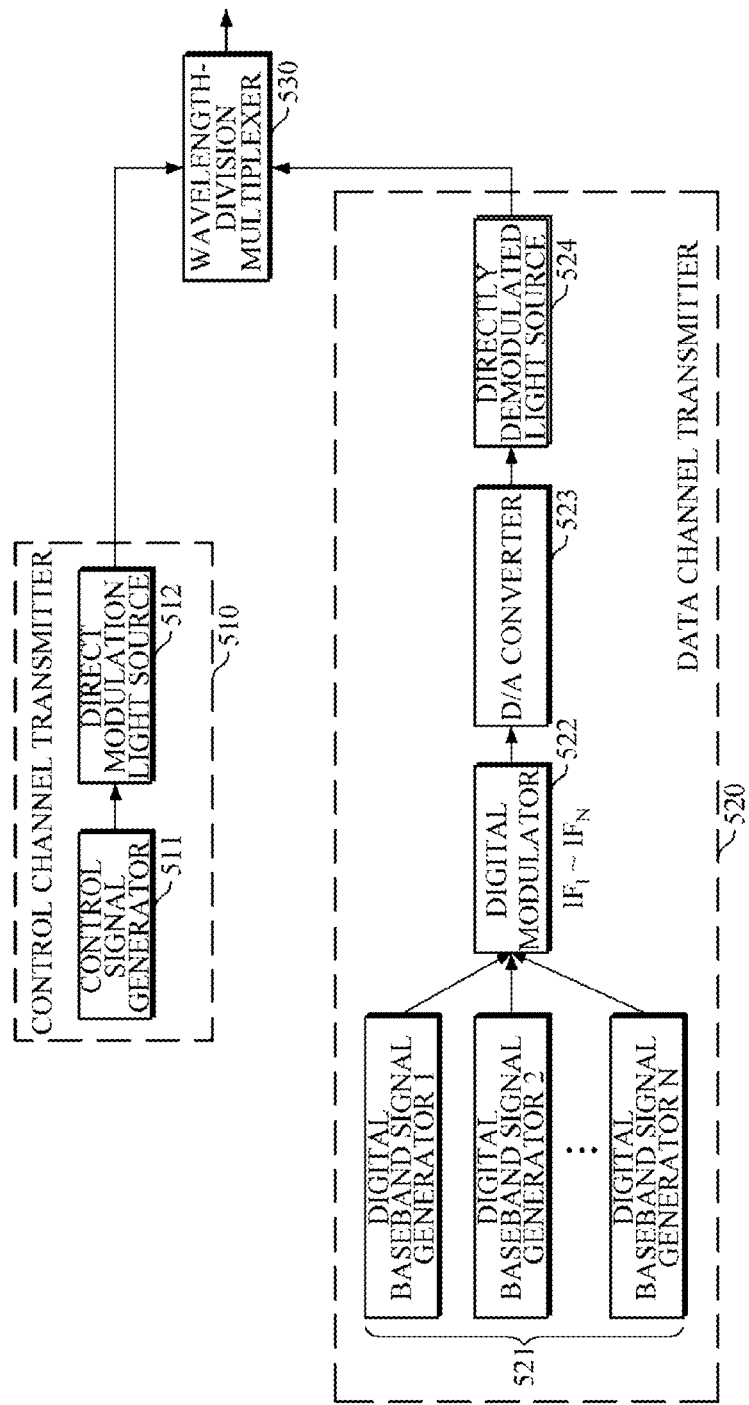
FIG. 11A is a diagram illustrating a transmission apparatus for WDM-based transmission of a control signal according to a third exemplary embodiment.

FIG. 11A is a diagram illustrating a transmission apparatus for WDM-based transmission of a control signal according to a third exemplary embodiment.

Referring to FIG. 11A, a transmission apparatus includes a control channel transmitter 510, a data channel transmitter 520, and a wavelength-division multiplexer 530.

The control channel transmitter 510 includes a control signal generator 511 and a directly modulated light source 512. The control signal generator 511 generates a control signal in a serial binary format. The directly demodulated light source 512 converts a signal output from the control signal generator 511 into an optical signal at a predetermined wavelength. In this case, the directly modulated light source 512 may use a wavelength predetermined according to the wavelength plan for a control signal, as shown in FIG. 9.

The data channel transmitter 520 includes a digital baseband signal generator 521, a digital demodulator 522, a D/A converter 523, and a directly demodulated light source 524.

The digital baseband signal generator 521 generates an IQ signal to be transmitted to the RUs or the DU. In one exemplary embodiment, a plurality of digital baseband signal generators 521 may be provided, and multiple parallel signals generated by the respective digital baseband signal generators 521 are input to the digital modulator 522. The digital modulator 522 combines generated single- or multi-channel baseband IQ signals to thereby generate a digital IQ signal loaded on a single- or multi-IF carrier that is up-converted to a preassigned IF frequency. The D/A converter 523 converts the digital IQ-modulated signal into an analog signal by using an appropriate sampling rate and bit resolution for optical transmission. The directly modulated light source 524 optically modulates a signal output from the D/A converter 523 and outputs a resultant signal.

Although not illustrated, the control channel transmitter 510 and the data channel transmitter 520 each may include an amplifier and an attenuator that each have an appropriate gain.

The wavelength-division multiplexer 530 receives the control signal output from the control channel transmitter 510 and the data signal output from the data channel transmitter 520 and combines the two signals in wavelength domain. In this case, any type of optical combiner may be used as the wavelength-division multiplexer 530.

Figure 11B:
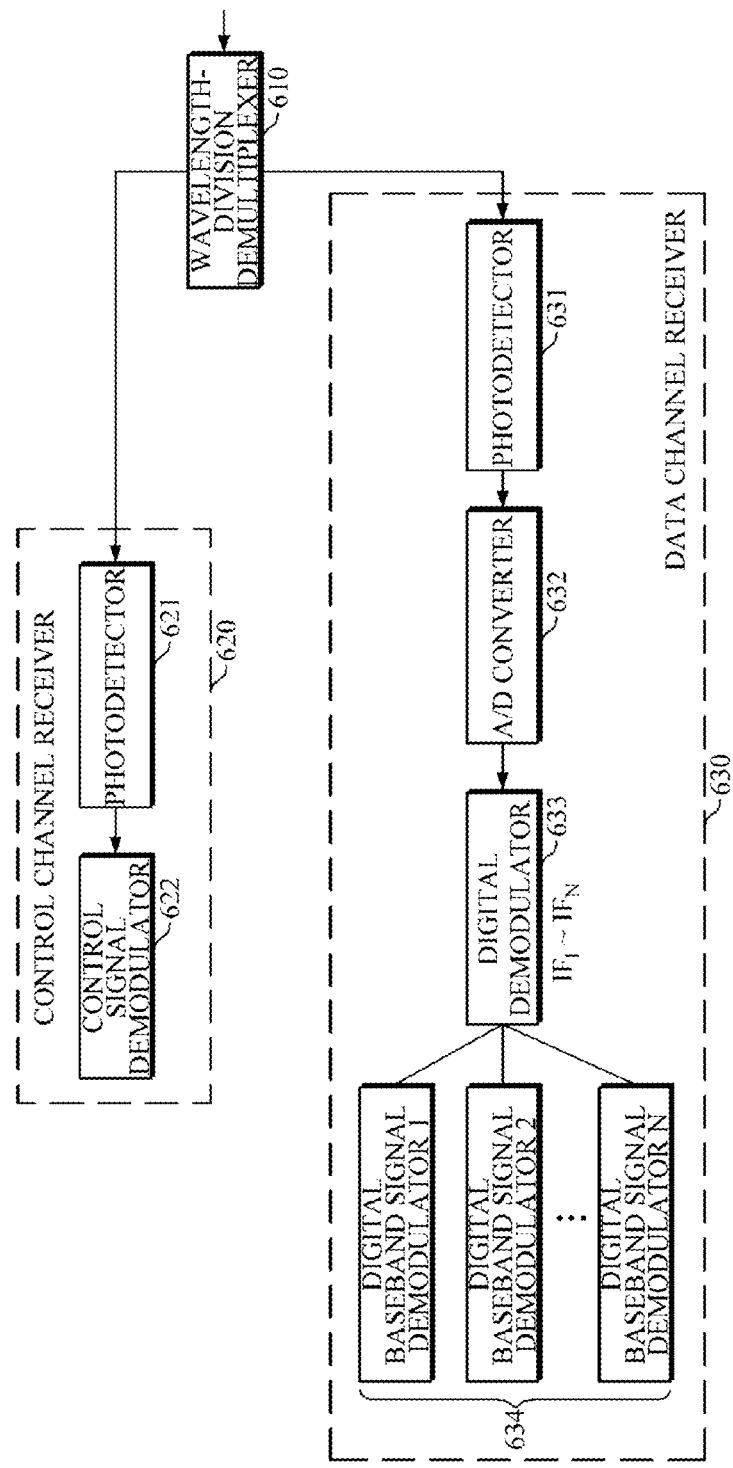
FIG. 11B is a diagram illustrating a configuration of a receiving apparatus for WDM-based transmission of a control signal according to a third exemplary embodiment.

FIG. 11B is a diagram illustrating a configuration of a receiving apparatus for WDM-based transmission of a control signal according to a third exemplary embodiment.

Referring to FIG. 11B, a receiving apparatus includes a wavelength-division demultiplexer 610, a control channel receiver 620, and a data channel receiver 630.

The wavelength-division demultiplexer 610 splits a received signal into a control signal and a data signal in wavelength domain.

The control channel receiver 620 includes a photodetector 621 and a control signal demodulator 622. The photodetector 621 electrically converts the control signal output from the wavelength-division demultiplexer 610. The control signal demodulator 622 demodulates the electrically converted serial binary data to thereby allow the received control signal to be used in operation of DU or RU.

The data channel receiver 630 includes a photodetector 631, an A/D converter 632, a digital demodulator 633, and a digital baseband signal demodulator 634.

The photodetector 631 electrically converts the data signal output from the wavelength-division demultiplexer 610. The A/D converter 632 converts an analog data signal from the photodetector 631 into a digital signal by using an appropriate sampling rate and bit resolution. In this case, to suppress deterioration of signal quality due to interference of a control channel, high bandpass filters may be provided in front of the A/D converter 632. The digital demodulator 633 converts a received digital IQ signal, which is loaded on a single- or multi-IF carrier, into a single- or multi-channel baseband IQ signal by frequency-down-converting the received digital IQ signal. The digital baseband signal demodulator 634 demodulates the signal, which is destined for the RU or DU, into a digital baseband data signal with a binary waveform.

Although not illustrated, the control channel receiver 620 and the data channel receiver 630 each may include an amplifier and an attenuator that each have an appropriate gain.

Figure 12A:
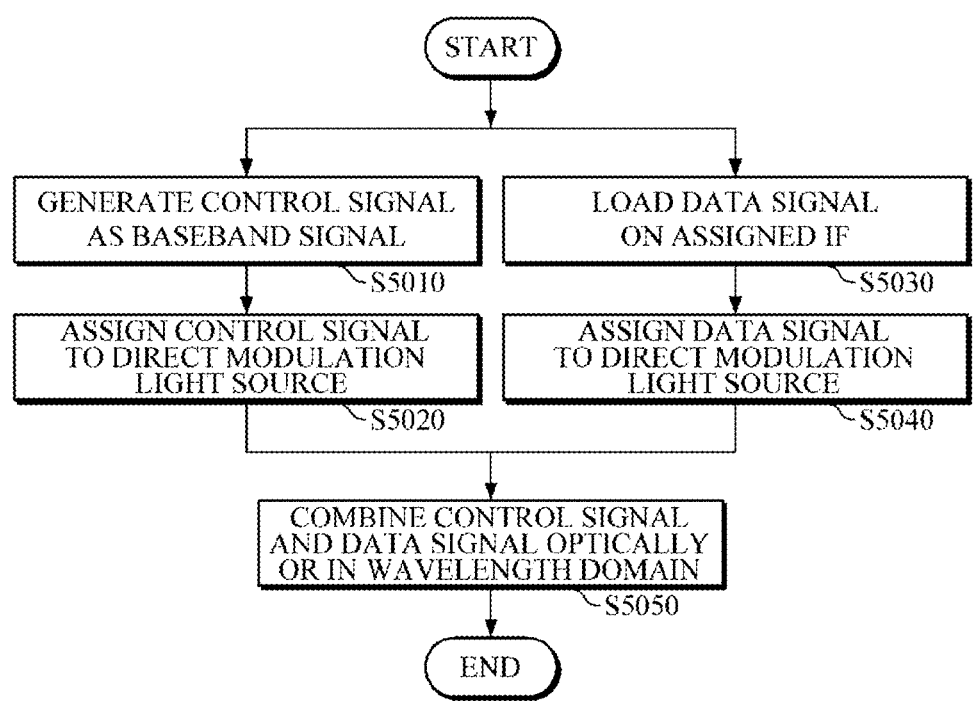
FIG. 12A is a flowchart illustrating an optical transmission method for WDM-based transmission of a control signal according to a third exemplary embodiment.

FIG. 12A is a flowchart illustrating an optical transmission method for WDM-based transmission of a control signal according to a third exemplary embodiment.

Referring to FIG. 12A, a transmission apparatus generates a control signal which is a designated baseband signal, as depicted in S5010. Then, the transmission apparatus optically modulates the control signal at a designated wavelength, as depicted in S5020.

The transmission apparatus loads a data signal on preassigned intermediate frequencies, as depicted in S5030. In detail, single- or multi-channel baseband IQ signals destined for an RU or a DU are combined together to thereby generate a digital IQ signal loaded on a single- or multi-IF carrier that is up-converted to a preassigned IF, and then a digital IQ-modulated signal is converted into an analog signal with an appropriate sampling rate and bit resolution for optical transmission. The transmission apparatus optically modulates the data signal, as depicted in S5040. Here, operations S5010 and S5020 and operations S5030 and S5040 may be concurrently performed as shown in FIG. 12A, which is, however, only provided as an exemplary embodiment, and said operations may be sequentially performed.

Then, the transmission apparatus combines the control signal and the data signal optically or in wavelength domain, and outputs a resultant signal, as depicted in S5050.

Figure 12B:
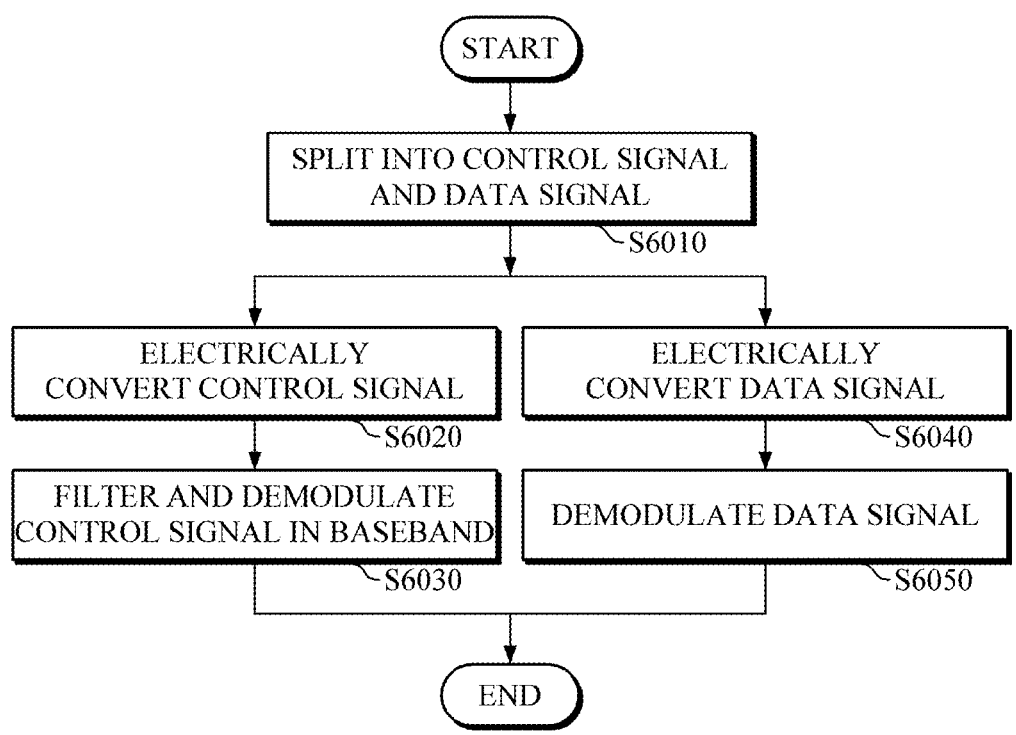
FIG. 12B is a flowchart illustrating an optical receiving method for WDM-based transmission of a control signal according to a third exemplary embodiment.

FIG. 12B is a flowchart illustrating an optical receiving method for WDM-based transmission of a control signal according to a third exemplary embodiment.

Referring to FIG. 12B, a receiving apparatus splits a received signal into a control signal and a data signal in wavelength domain, as depicted in S6010.

The receiving apparatus electrically converts the control signal, as depicted in S6020, and filters the converted control signal to select a control signal within a baseband and demodulate the selected control signal, as depicted in S6030. That is, serial binary data is demodulated into the control signal in a baseband, so that the received control signal can be used in operation of DU or RU.

The receiving apparatus electrically converts the split data signal, as depicted in S6040, and demodulates the converted data signal, as depicted in S6050. Specifically, the split analog data signal is converted into a digital signal by using an appropriate sampling rate and bit resolution, a digital IQ signal loaded on the single- or multi-IF carrier is downconverted in frequency and is converted into a single- or multi-channel baseband IQ signal, and a signal that is destined for the RU or the DU is demodulated into a digital baseband signal. Here, operations S6020 and S6030 and operations S6040 and 6050 may be concurrently performed, as shown in FIG. 4B, which is, however, only provided as an exemplary embodiment, and said operations may be sequentially performed.

According to the exemplary embodiments as described above, a method and apparatus for transmitting various signals (e.g., antenna gains, RF output powers, and optical link management variables) for a digital unit to control radio units in a next-generation mobile fronthaul network which utilizes an analog RoF technique to process a large volume of data traffic are provided, thereby enabling communication service providers to reduce their operational costs for mobile communication base stations.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for transmitting a control signal in an analog radio-over-fiber (RoF)-based mobile fronthaul, the apparatus comprising:
   a data channel transmitter configured to generate a data signal at a preassigned frequency or wavelength;
   a control channel transmitter configured to generate a control signal at a designated frequency or wavelength that is shared with other apparatuses;
   a combiner configured to combine the data signal with the control signal; and
   a directly demodulated light source to optically modulate a signal output from the combiner,
   wherein the combiner receives signals from the data channel transmitter and the control channel transmitter, combines the received signals in frequency domain, and outputs a resultant signal to the directly modulated light source,
   wherein the control channel transmitter comprises a control signal generator configured to generate the control signal in a serial binary format, a multi-level modulator configured to convert the control signal with a serial binary format into a multi-level modulated signal, and an electrical modulator configured to load the multi-level modulated signal on a designated intermediate frequency.

2. The apparatus of claim 1, wherein the control signal generator configured to generate the control signal as a digital baseband signal with the serial binary format.

3. The apparatus of claim 1, wherein the data channel transmitter comprises a digital baseband signal generator configured to generate a data signal as a single or multi-channel baseband in-phase and quadrature-phase (IQ) signal to be transmitted to another apparatus, a digital modulator configured to combine single or multi-channel baseband IQ signals to thereby generate a digital IQ signal loaded on a single- or multi-IF carrier that is up-converted to a preassigned IF frequency, and a digital-to-analog (D/A) converter configured to convert the digital IQ signal into an analog signal.

4. The apparatus of claim 1, wherein the combiner receives signals output from the data channel transmitter and the control channel transmitter, combines the received signals in wavelength domain and outputs a resultant signal, and the control channel transmitter comprises a control signal generator configured to generate the control signal as a digital baseband signal with a serial binary format, and a directly modulated light source configured to convert the signal output from the control signal generator into an optical signal with the designated wavelength.

5. The apparatus of claim 1, wherein:
   the combiner receives signals output from the data channel transmitter and the control channel transmitter, combines the received signals in wavelength domain, and outputs a resultant signal, and
   the data channel transmitter comprises:
   a digital baseband signal generator configured to generate a data signal as a single- or multi-channel baseband IQ signal to be transmitted to another apparatus,
   a digital modulator configured to combine generated single- or multi-channel baseband IQ signals to thereby generate a digital IQ signal loaded on a single- or multi-IF carrier that is up-converted to a preassigned IF frequency,
   a D/A converter configured to convert the digital IQ signal into an analog signal, and a directly modulated light source configured to optically modulate the analog signal from the D/A converter and output a resultant signal.

6. An optical transmitting and receiving method for an analog RoF-based mobile fronthaul, the optical transmitting and receiving method comprising:
- transmitting a signal; and
- receiving the signal,
- wherein the transmitting of the signal comprises
  - generating a data signal at a preassigned frequency or wavelength;
  - generating a control signal in a serial binary format at a designated frequency or wavelength that is shared with other apparatuses;
  - converting the control signal with a serial binary format into a multi-level modulated signal;
  - loading the multi-level modulated signal on a designated intermediate frequency;
  - combining the data signal with the control signal to generate the signal;
  - outputting a resultant signal; and
  - optically modulating a signal resulting from the combination of the data signal and the control signal,
- wherein the control signal and the data signal are combined in frequency domain.

7. The optical transmitting and receiving method of claim 6, wherein the transmitting of the signal further comprises optically modulating a signal resulting from the combination of the data signal and the control signal,
- wherein the control signal and the data signal are combined in frequency domain, and the control signal is generated at a designated intermediate frequency or as a baseband signal.

8. The optical transmitting and receiving method of claim 6, wherein the data signal and the control signal are combined in wavelength domain, and the control signal is generated as a designated frequency signal.

9. The optical transmitting and receiving method of claim 6, wherein the receiving of the signal comprises
- splitting the received signal into the control signal and the data signal;
- demodulating the control signal of the designated frequency or wavelength which is shared with other apparatuses; and
- demodulating the split data signal.

10. The optical transmitting and receiving method of claim 9, wherein the receiving of the signal further comprises electrically converting the received signal before splitting,
- wherein the splitting of the received signal comprises splitting the electrically converted signal into the control signal and the data signal in frequency domain, and the demodulation of the control signal comprises demodulating only the control signal of the designated frequency or a baseband signal.

11. The optical transmitting and receiving method of claim 9, wherein the splitting of the received signal comprises splitting the received signal into the control signal and the data signal in wavelength domain, and the demodulation of the control signal comprises electrically converting the split control signal and demodulating the control signal of the designated frequency from the electrically converted signal.

* * * * *